United States Patent [19]
Richmond et al.

[11] Patent Number: 5,804,938
[45] Date of Patent: Sep. 8, 1998

[54] GATE OPERATOR WITH EXTENSIBLE ACTUATING ARM

[75] Inventors: Moscow K. Richmond, Inglewood; Thomas R. Richmond, Santa Ana; Patrick S. Kochie, Simi Valley, all of Calif.

[73] Assignee: Doorking, Inc., Inglewood, Calif.

[21] Appl. No.: 625,135

[22] Filed: Apr. 1, 1996

[51] Int. Cl.[6] .................................................. H02P 3/00
[52] U.S. Cl. ........................ 318/282; 318/470; 49/340; 49/363
[58] Field of Search ................... 49/26, 31, 324–363; 318/280–295, 445–479, 484, 600–603

[56] References Cited

U.S. PATENT DOCUMENTS

| | | | |
|---|---|---|---|
| 4,338,553 | 7/1982 | Scott, Jr. | 318/266 |
| 4,364,003 | 12/1982 | Phipps | 318/266 |
| 4,429,264 | 1/1984 | Richmond | 318/266 |
| 4,501,090 | 2/1985 | Yoshida et al. | 49/334 |
| 4,831,509 | 5/1989 | Jones et al. | 318/266 |
| 4,850,094 | 7/1989 | Lybecker | 29/434 |
| 4,887,205 | 12/1989 | Chou | 49/25 |
| 4,999,551 | 3/1991 | Yoshida et al. | 318/286 |
| 5,422,551 | 6/1995 | Takeda et al. | 318/265 |

*Primary Examiner*—David S. Martin
*Attorney, Agent, or Firm*—Robert J. Schaap

[57] ABSTRACT

A gate operator with an extensible actuating arm adapted for light to moderate gate passing traffic. The operator comprises a small drive unit, such as an electric motor drive, and a rotatable drive shaft, such as a worm shaft driven through operation of the motor. An extensible shaft or so-called ball race shaft, cooperates with the rotatable shaft and extends inwardly or outwardly in response to rotation of the rotatable shaft. A microprocessor operated control circuit is used with or forms part of the operator, and measures a number of counts generated by magnetic elements rotatable with the worm shaft, and which are equivalent to distance units of measurement. In this way, the distance on the opening and closing movement is measured and stored in the microprocessor, so that on subsequent movements, the gate can open and close to precisely the open and closed positions without stopping short of or banging into such end positions. The motor mechanism of the operator is pulsed during the complete first opening movement and the complete first closing movement due to the fact that the operator does not know the exact position of the gate when the operator is first started. In this way, in the event of any bottoming out of the extensible and retractable arm, such as the ball race shaft against the end of the worm shaft, damage to the operator will not result.

26 Claims, 2 Drawing Sheets

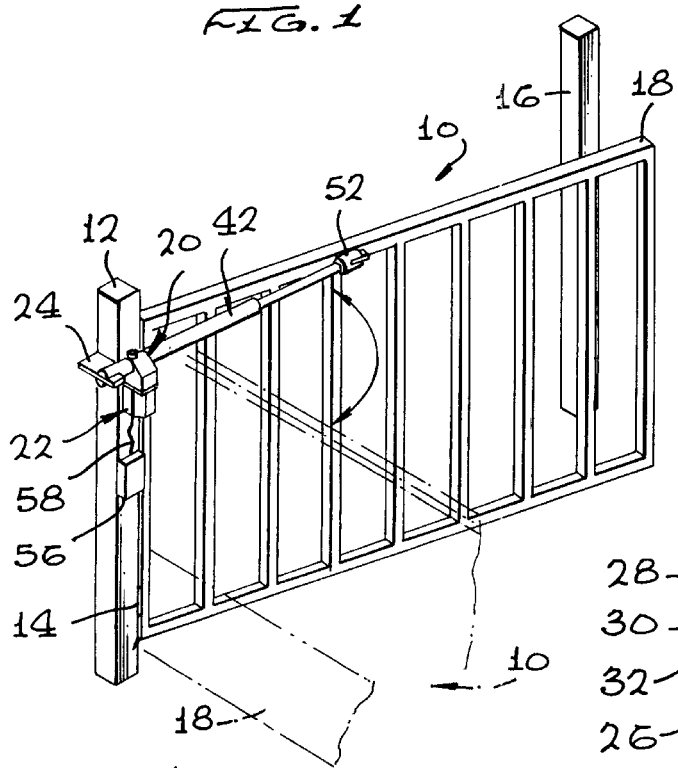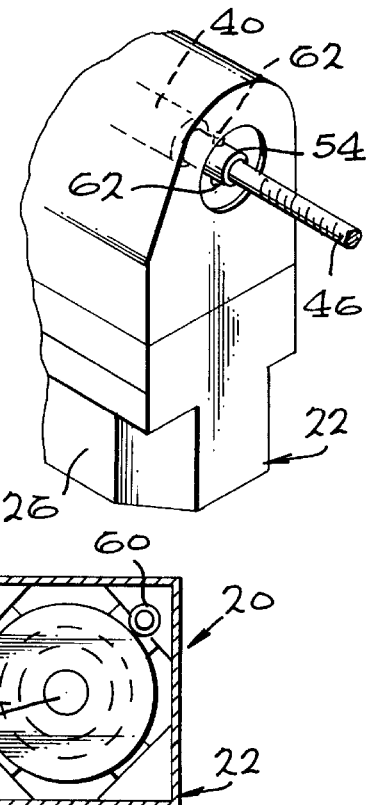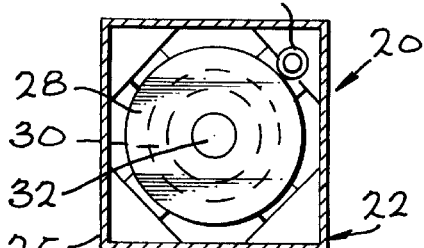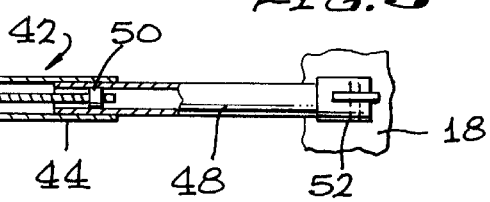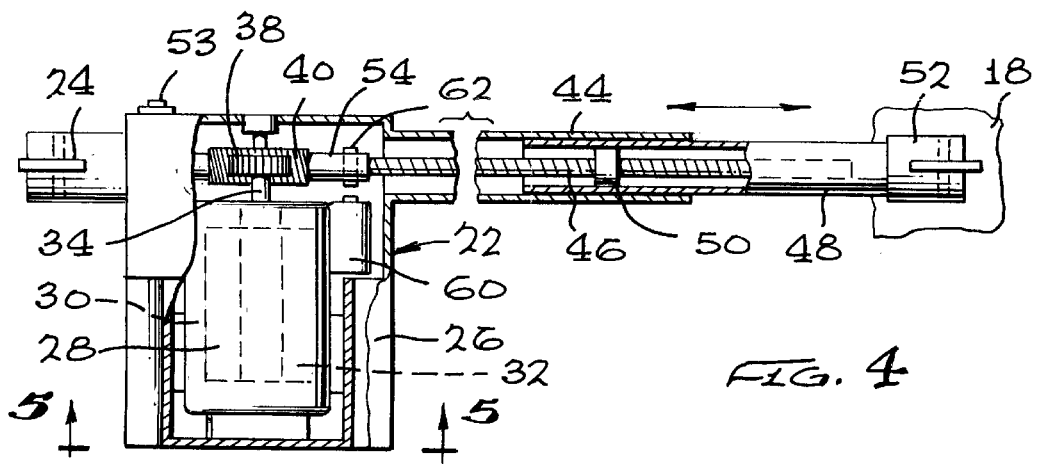

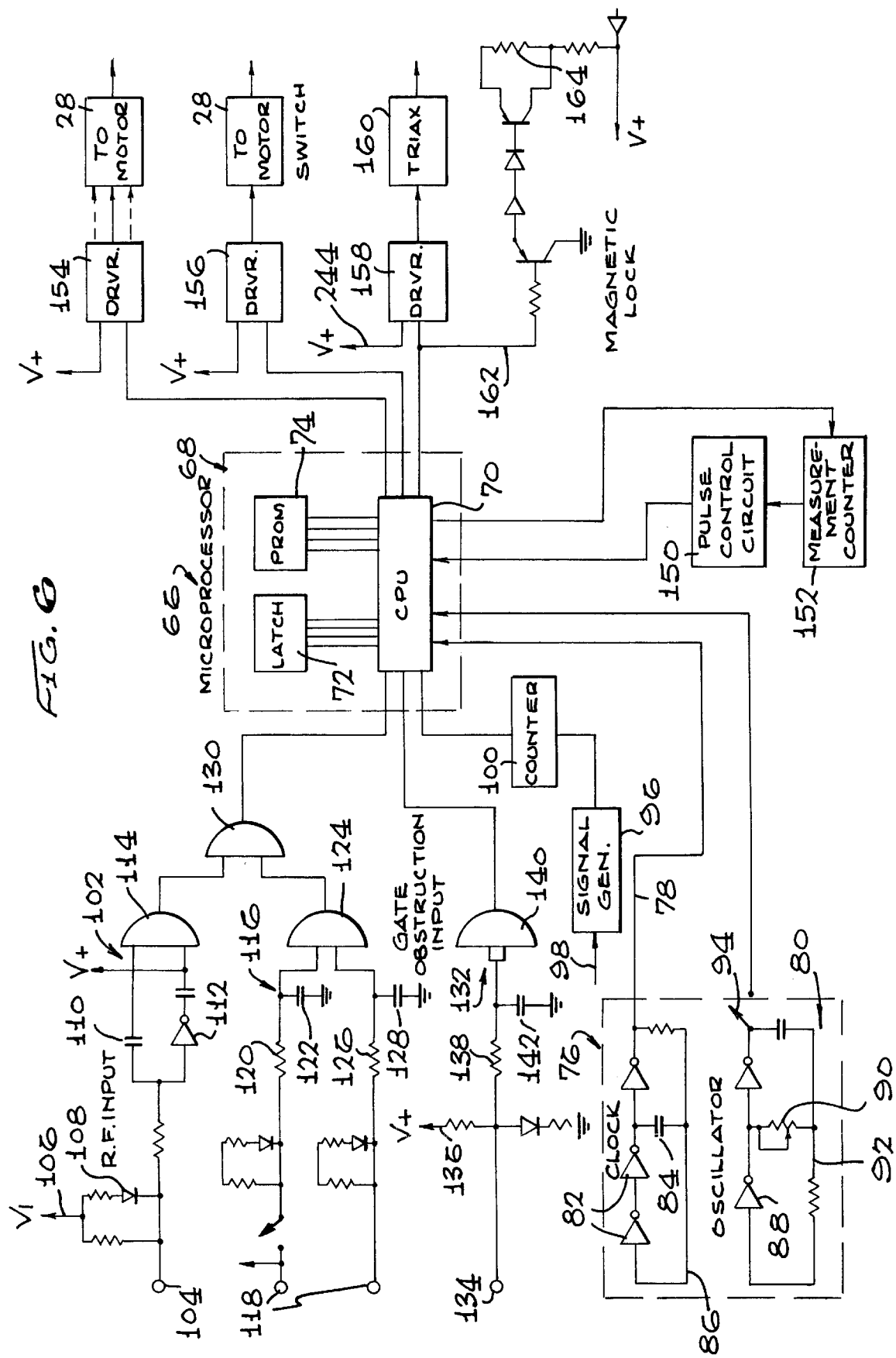

GATE OPERATOR WITH EXTENSIBLE ACTUATING ARM

BACKGROUND OF THE INVENTION

1. Field of the Invention

This invention relates in general to certain new and useful improvements in gate operators, and more particularly, to gate operators which utilize an extensible arm for shifting a gate between open and closed end positions, and which includes a unique control circuit for driving the gate a precisely measured distance between such end positions, and which also pulses the driving movement of the gate during portions of the opening and closing movements.

2. Brief Description of Related Art

There have been certain proposed and commercially available gate operators which use small electric drive motors and an extensible arm for connection to the gate in order to open and close the gate. Typically, these gate operators include the electric drive motor mounted within a small outer housing and operate a drive shaft, such as a worm shaft, extending outwardly therefrom. The worm shaft is usually included within a tubular retaining arm and the worm shaft also cooperates with an actuating arm to cause extensible and retractable movement of the actuating arm. Typically, the actuating arm may include a nut or like mechanism in the interior thereof to cause such extensible and retracting movement in response to rotation of the worm shaft.

The extensible and retractable actuating arm may be in the form of a ball race shaft which rides along the worm shaft. Typically, the ball race shaft includes an elongate slot with a bearing disposed within the slot and enables axial movement in response to rotational movement of the worm shaft. This type of shaft is also frequently referred to as a "Thomson Race" shaft.

This type of drive mechanism is highly effective where there is not sufficient space in which to mount a larger drive mechanism using swingable arms of the type shown in U.S. Pat. No. 4,429,264, dated Jan. 31, 1984 for System and Method For the Automatic Control of Electronically Operable Gates by Moscow K. Richmond, et al. These small gate operators are ideal in areas where there is a minimum amount of space as, for example, where the gate may abut against a wall in a fully opened position, or where the gate may abut against a property line of another party in the fully opened position. This is due to the fact that the small operator can literally be mounted on a post which holds a swinging gate or is otherwise located with respect to a sliding gate.

In the aforesaid U.S. Pat. No. 4,429,264, dated Jan. 31, 1984 by Moscow K. Richmond, et al., there is provided a control circuit for operating a gate used in conjunction with or forming part of a gate operator for opening and closing a gate in controlled movements. Typically, this operator measured the amount of distance in terms of counts between open and closed positions, and used those measured counts for controlling movement of the gate between subsequent open and closed positions.

There have also been gate opening and closing apparatus which utilize sensors, such as optical sensors, for measuring the extent of movement of the gate between the opened and closed positions and thereafter controlling the gate during movements for the measured distance. In this way, the gate opening and closing apparatus will effectively measure the distance of the first movement of the gate and thereafter move the gate for that same distance during each subsequent opening and closing movement. One such opening and closing apparatus is more fully illustrated and described in U.S. Pat. No. 4,429,264, dated Jan. 31, 1984 by Moscow K. Richmond, for "System and Method For the Automatic Control of Electrically Operated Gates."

U.S. Pat. No. 4,159,599, dated Jul. 3, 1979 by Moscow K. Richmond for "Gate Opening and Closing Assembly" discloses a gate which is slidable between opened and closed positions and which uses a solenoid operated locking mechanism. U.S. Pat. No. 4,313,281, dated Feb. 2, 1982 by Moscow K. Richmond for "Gate Opening and Closing Apparatus and Method" also discloses a positive locking mechanism for use in locking a gate when it reaches a gate closed position. U.S. Pat. No. 4,330,958 by Moscow K. Richmond, dated May 25, 1982 for "Gate Opening and Closing Assembly With Automatic Locking Means" also discloses a gate opening and closing assembly with an automatic locking means for locking the gate when it reaches a closed position.

The use of any type of circuit for measuring the distance of movement of a gate and using that measure of the distance for subsequent movements, has not been employed in any gate operator with an extensible and retracting actuating arm for causing movement of the gate. Typically, it was believed and understood that a gate operator with an extensible and retractable actuating arm could not be controlled to nearly the same degree as a swinging arm on a gate operator of the type described in the aforesaid Richmond, et al. U.S. Pat. No. 4,429,264. Moreover, and for similar reasons, there has not been any obstruction detection circuit associated with gate operators utilizing an extensible and retractable actuating arm.

One of the major problems associated with gate operators using an extensible and retractable actuating arm operable by a worm shaft rotatable about its axis is the fact that extreme care must be used when mounting the operator. This is necessary to ensure against the bottoming out of the extensible and retractable arm against the end of the worm shaft. The bottoming out of the actuating arm against the worm shaft would typically cause damage, not only to the worm shaft but also to the drive mechanism as well. Accordingly, it was necessary for the installer to either set up limit switches on the gate to preclude this potential damage, or otherwise mount the gate in such position that the gate would only open for a limited movement.

In addition, in prior art operators using an extensible and retractable actuating arm, there is always a tendency for the ball race shaft to buckle slightly with respect to the worm shaft when the ball race shaft is close to being fully extended. This tendency to buckle causes a choppy movement and also puts a strain on the drive motor thereby resulting in potential damage to the motor and the mechanical members.

OBJECTS OF THE INVENTION

It is, therefore, one of the primary objects of the present invention to provide a gate operator which uses an extensible and retractable actuating arm to cause opening and closing movement of a gate and in which the distance of movement of the gate is measured on the initial opening and closing movements and controlled for the measured distance on all subsequent movements.

It is another object of the present invention to provide a gate operator of the type stated in which a unique microprocessor operated control circuit measures the initial movement of the gate from the closed to the open position, and measures from the open to the closed position, and moves the gate for that measured distance on all subsequent opening and closing movements.

It is a further object of the present invention to provide a gate operator of the type stated in which the gate is pulsed for the initial opening and closing movements thereof to preclude any damage to the operator or any portion thereof if the gate should strike a fixed end position or otherwise if the extensible shaft should bottom out.

It is an additional object of the present invention to provide a gate operator of the type stated in which a portion of each of the opening and closing movements is pulsed to prevent and preclude any potential damage to the gate operator from potential bottoming out.

It is yet another object of the present invention to provide a gate operator of the type stated which can be constructed in the form of a very small compact unit and which allows use where a gate in the opened position may abut against a region in which an operator could not be installed.

It is another salient object of the present invention to provide a gate operator of the type stated which can be constructed at a relatively low unit cost and which is highly reliable in operation.

It is still another object of the present invention to provide a gate operator of the type stated in which the motor mechanism of the operator is pulsed during portions of the movement of the actuating arm in order to preclude damage to the motor or any other portion of the operator in the event of a stalling or bottoming-out of a ball race shaft against the end of a worm shaft.

It is yet a further salient object of the present invention to provide a method of operating a gate using an actuating arm which is extensible and retractable for opening and closing a gate and which is capable of measuring distance of initial movements of the gate to control movement of the gate on subsequent movements for the same measured distance.

With the above and other objects in view, our invention resides in the novel features of form, construction, arrangement, and combination of parts and components presently described and pointed out in the claims.

BRIEF SUMMARY OF THE INVENTION

A gate operator for moving a gate between open and closed fixed end positions and where one of said fixed end positions may have a limited access space there beyond. As a simple example, in a swinging gate which moves between an opened position and a closed position, a gate in the fully opened position may be closely spaced to or abutting against a wall at the fully opened fixed end position. As a result, there would not be sufficient space to install a gate operator between the wall and that opened position.

The gate operator of the present invention comprises a drive mechanism, which in a preferred embodiment, adopts the form of a canister-type drive motor mechanism and which can be directly mounted to either the gate or the post which holds the gate. The drive mechanism is a small low horse power driving mechanism, but nevertheless has sufficient power to move the gate between the open and closed fixed end positions.

The drive mechanism of the present invention preferably comprises a small electric motor mounted within a canister-type housing. Moreover, a suitable gear structure is provided in the drive housing in order to provide a proper gear drive ratio to an output shaft on the motor. However, with this construction, the entire drive mechanism can be easily and conveniently mounted directly to a post upon which the gate is hingedly mounted.

An actuating arm is powered by the drive mechanism and has an arm section which is extensible and retractable in order to move the gate between the two fixed end positions. Thus, when the motor is driven in one direction, the extensible and retractable section of the actuating arm will extend and cause the gate to move to a closed position. When the motor is driven in the opposite direction, the extensible and retractable arm will retract and cause the gate to move to the opened position. However, by simple different coupling, the drive mechanism could cause the gate to move to the opened position on extensible movement of the drive arm and the closed position upon retracting movement of the actuating arm.

In one of the unique aspects of the present invention, a control means is operatively connected to the drive means and actually measures the distance of movement between one fixed end position and the other fixed end position as the gate is moving between those two end positions on the first movement path. Thus, on the first occasion when the gate operator is actuated, the control means will literally measure the distance of travel from the closed position to the opened position. On each subsequent movement of the gate from the closed position to the open position, the control means will drive the gate for precisely that distance. In like manner, on the first movement between the opened position to the closed position, the control means will also measure the amount of movement. Again, the control means will cause the drive means to move the gate for precisely that measured distance on all subsequent movements between the opened position to the closed position.

The present invention also includes an obstruction detection circuit, such that it will cause the gate to immediately move to the opened position in the event that the gate contacts an obstruction in moving from the open position to the closed position. In like manner, the obstruction detection circuit will also cause the gate to immediately move back to a closed position in the event that the gate contacts some obstruction during movement from the closed position to the opened position. The control means will actually sense the fact that the gate is not moving as anticipated in response to a movement command. In this way, the control means will thereby recognize that cessation of movement as an obstruction.

The actuating arm which is used in the gate operator of the invention actually has a first shaft portion which is fixed to and rotated along its central axis by the drive mechanism. An extensible and retractable arm section is connected to the rotating shaft portion and is extensible in response to rotation of the rotatable shaft portion in one direction and is retractable in response to rotation of the rotatable shaft portion in an opposite direction.

As indicated previously, the second shaft portion identified as the extensible and retractable arm section may adopt the form of a so-called "ball race" shaft or "Thomson Race" shaft. As indicated previously, one of the main problems with prior gate operators using an extensible and retractable arm was the fact that the extensible and retractable arm portion would tend to bottom out at the end of the worn shaft. If the motor was operating, e.g., turning, the motor would tend to burn out or otherwise, damage to some mechanical portion of the operator would inevitably result. Due to this fact, it was necessary, in prior art operators, to carefully install limit switches in order potentially avoid this particular problem.

In accordance with the present invention, it has been found that by pulsing the motor very rapidly, the drive power of the motor is reduced during portions of the actual movement of the gate. This reduced drive power will thereby preclude any substantial damage either to the motor or other mechanical portions of the operator in the event of a potential bottoming out.

Due to the fact that the operator does not know the exact position of the gate on the initial and first opening movement and on the first closing movement, the motor mechanism is pulsed for the entire first opening movement and the entire first closing movement. In this way, when the gate does reach a fully opened or fully closed position and if there is a bottoming out of the extensible and retractable arm against the end of the worm shaft, damage to the operator will not result. Thereafter, on each subsequent opening movement and each subsequent closing movement, the operator is also pulsed for the beginning first few feet of the movement and the beginning last few feet of the movement. Thus, for example, in an opening movement, as the gate begins to move away from the closed position towards the open position, the motor mechanism is pulsed causing a pulsing movement of the gate for at least the first few feet. Thereafter, the motor is continuously operated without pulsing until it reaches a few feet in advance of the fully opened position. At that point, the control circuit of the invention causes the motor mechanism to start pulsing the operation of the gate again. Thus, the gate will be pulsed to the fully opened position for the last few feet of movement towards the open position. In like manner, the motor mechanism operates in the same way when moving the gate from the open position to the close position.

As also indicated previously, the pair of arm sections, when extended, such as the arm shaft and the ball race shaft, will tend to buckle somewhat, particularly when the ball shaft is extended towards the end of the worm shaft. This buckling tends to interfere with the smooth operation of moving the gate and also tends to put a strain on the motor. It is for this reason, that the gate is also pulsed during the first several feet of movement from an opened position towards the closed position or from the closed position toward the opened position.

The pulsing which occurs is quite rapid and is not necessarily observable to the naked eye. The pulsing of the motor occurs every eighth to every fourth second. For example, the motor will be energized for about one-eighth of a second and off for about one-sixteenth of a second. The motor has also been effectively operated by energizing the motor for one-sixteenth of a second and de-energizing the motor for one-eighth of a second interval. This pulsing has been found to be quite effective in accomplishing the desired result. For this purpose, however, it is obviously necessary to provide a drive motor even though lightweight, which can withstand a rapid pulsing action of this type.

The term "gate" as used herein is used in a broad sense to encompass any member which extends across an access opening. Thus, the term "gate" is used in a broad sense to include doors and the like. Moreover, the gate operator of the invention is applicable to so-called "swinging gates" as well as so-called "sliding gates". In addition, it can be used with overhead garage doors and the like.

This invention has many other objects and other purposes which will become more fully apparent from a consideration of the forms in which it may be embodied. One of the forms of the gate operator of the present invention is more fully illustrated in the accompanying drawings and described in more detail in the following detailed description of the invention. However, it should be understood that these accompanying drawings and the following detailed description are set forth only for purposes of illustrating and describing the general principles of the invention and are not to be taken in a limiting sense.

BRIEF DESCRIPTION OF THE DRAWINGS

Having thus described our invention in general terms, reference will now be made to the accompanying drawings in which:

FIG. 1 is a schematic perspective view showing one form of gate operator constructed in accordance with the present invention and showing an operative connection to a gate;

FIG. 2 is a side elevational view, largely broken away and in section, of a gate operator constructed in accordance with and embodying the present invention;

FIG. 3 is a perspective view of a motor mechanism used in the operator of the present invention;

FIG. 4 is a vertical sectional view, similar to FIG. 2 and showing the actuating arm of the operator in a retractable position;

FIG. 5 is an elevational view, taken substantially along line 5—5 of FIG. 4 and showing a portion of the motor mechanism of the present invention; and FIG. 6 is a schematic circuit view showing the control circuit forming part of the gate operator of the present invention.

DETAILED DESCRIPTION OF PREFERRED EMBODIMENTS

Referring now in more detail and by reference characters to the drawings which illustrate a preferred embodiment of the present invention, FIG. 1 shows a perspective view of a gate 10 which is hingedly rotatable about a vertical axis at one of its ends, typically referred to in the art as a so-called "swing gate" or "swinging gate". In the embodiment of the invention as illustrated in FIG. 1, the swinging gate 10 is hingedly mounted to a fixed post 12, typically through hinges 14.

In the embodiment of the invention as shown in FIG. 1, the gate is movable between a closed position, that is, where the gate extends between the fixed post 12 and an opposite post 16, thereby closing an access opening. However, the swinging gate 10 is also shiftable through an angle of approximately ninety degrees to a fully opened position. In this case, a fixed wall or abutment 18 is shown adjacent that fully opened position.

In one of the important aspects of the present invention, there are often conditions in which a swingable gate is desired but where there is little or no availability of space beyond the fully opened position in which to mount a gate operator. Thus, for example, in the embodiment as illustrated in FIG. 1, a gate operator would have to be mounted on the opposite side of the fixed wall or abutment 18 in order to move the swinging gate 10 between an opened or closed position. In addition the fixed wall or abutment 18 may also represent a property line identifying another party's property in which the operator could not be mounted. Consequently, the present invention provides a gate operator 20 which overcomes this problem.

Gate arrangements of the type illustrated in FIG. 1 are often used with security apartment buildings and similar commercial establishments, along with dwelling structures. The access openings permit passage of either people or vehicles, and the gate is typically shifted from the closed to the open position, for such access. Generally, many commercially available prior art gate operators employ a radio frequency receiver-transmitter system, such that the party desiring to open the gate will actuate the transmitter to generate a signal which will, in turn, cause a receiver to energize a motor for shifting the gate. Other systems rely upon a magnetically operated key card, or for that matter, an actual key in which to energize the motor for opening and closing the gate. In this respect, the gate operator of the present invention can be used with any of these types of conventional inputs.

The gate operator of the present invention comprises a small drive mechanism 22 which is mounted on the fixed post 12, and typically on a plate 24 extending outwardly therefrom, as shown in FIG. 1. The small drive mechanism 22, however, must be pivotally or rotatably mounted on the plate 24 or otherwise pivotally or rotatably mounted directly to the fixed post 12.

The actual small drive mechanism 22 is more fully illustrated in FIGS. 2–5 of the drawings. In this case, it can be seen that the small drive mechanism 22 comprises an outer canister or housing 26 for holding a suitable electric motor 28. By reference to FIG. 5, it can be seen that the housing 26 is polygonal in shape as, for example, a rectangular shape, as shown. The electric motor 28 is cylindrically shaped and disposed tightly within the housing 26 as shown. Moreover, and as illustrated in FIG. 5, a lower portion of the motor, including the field winding 30 and armature 32, is illustrated.

Connected to the armature, or a shaft portion 32 extending from the armature 30, is a drive shaft 34 extending vertically upwardly from the electric motor 28. Thus, it can be observed that the motor is vertically arranged as shown. Mounted on the upper end of the drive shaft is a pinion gear, which meshes with a gear train 40 to cause operation of an actuating arm 42 as hereinafter described. The gear train 40 is only schematically illustrated in FIGS. 1 and 2 inasmuch as any type of conventional gear arrangement could be employed in order to operate the actuating arm 42.

The actuating arm 42 is more fully illustrated in FIGS. 2 and 4 of the drawings, and generally comprises an outer cylindrically shaped housing 44. Located concentrically within and extending axially through the housing is a rotatable worm shaft 46, which is connected to the gear train 40 and rotatable through operation of the electric motor 28. The electric motor 28 is bi-directional, such that it can rotate in one direction and thereby cause rotation of the rotatable worm shaft 46 in one direction such as a counter-clockwise direction. When the electric motor 28 is operated in an opposite direction, it will cause rotation of the rotatable worm shaft 46 in an opposite direction as, for example, a clockwise direction.

Extensible and retractable within the tubular housing 44 is an extensible and retractable arm 48 which cooperates with the rotatable shaft 46. The arm 48 is provided at its end facing the motor housing 26 with a fixed nut 50. This fixed nut 50 threadedly receives the rotatable worm shaft 46. Inasmuch as the fixed nut 50 is fixed within the extensible arm 48, rotatable movement of the rotatable shaft 46 as, for example, in a clockwise direction, will cause an extension of the extensible arm 48 outwardly from the housing 44. Rotation in the opposite direction will cause movement of the extensible arm 48 inwardly within the housing 44. For this purpose, and to ensure that the extensible arm 48 does not rotate along with the rotatable shaft 46, splines could be formed on the exterior surface of the end of the extensible arm 48 moveable within keyways formed within the housing 44.

At its outer end, the extensible and retractable arm 48 is provided with a coupling 52 for securement to the swinging gate 10 in the manner as shown in FIG. 1.

Operating mechanisms of this type have been proposed in the prior art but have limited effectiveness for those reasons indicated previously in connection with the description of the related art.

Also mounted on the housing 26 is a key release or other form of manually actuable release 53. There are occasions in which it is necessary to release the operator itself so that the gate can be manually opened and closed, as for example, in a fire or other situation in which there is an interruption in electrical power. In the event of a fire, an occupant of a secured area could operate the actuable release 53 and thereby pull the gate to the opened position. Due to the fact that the gear train 40 is relatively small, very little force is required to push the gate against this gear mechanism.

At its closed position against the post 16, the gate could be provided with a locking mechanism if desired which will open or close in response to a proper gate open or gate close signal. One such type of locking mechanism which can be used for automatically locking the gate in the closed position is taught in our issued U.S. Pat. No. 4,916,860, dated Apr. 17, 1990, by Moscow K. Richmond, et al.

The rotatable worm shaft 46 is actually secured to a hub 54 driven through the gear train 40. This hub is, in effect, a small drive shaft which is rotated when the electric motor 28 is energized. It can be seen by reference to FIG. 3 that the rotatable worm shaft 46 is secured to an end of the hub as, for example, by insertion into a recess on the end of the hub 54.

A control circuit is used in conjunction with the small drive mechanism 22 and is electrically connected to the electric motor 28. The control circuit is more fully illustrated in FIG. 6 and may be suitably contained within a control housing 56 also mounted on the fixed post 12, in the manner as shown, and electrically connected to the motor housing 26 through a conduit 58. In this respect, the control housing 56 is not necessarily required to be located in close proximity to the small drive mechanism 22 although it is desirable to do so.

The control circuit 66, more fully illustrated in FIG. 6 generally opens and closes the gate on an automated basis. The control circuit is designed to measure the amount of movement of the gate from the closed position to the open position and thereafter move the gate on each subsequent occasion for this measured distance. In like manner, the control circuit will measure the movement of the gate from the opened position back to the closed position and thereafter control the movement of the gate for this measured distance on each subsequent movement from the opened to the closed position.

In order to measure the distance, a sensor such as a magnetic sensor 60 is mounted within the housing 26. In this case, it can be seen that the magnetic sensor 60 is mounted directly to the side wall of the electric motor 28 in the manner as best shown in both FIGS. 4 and 5 of the drawings. Mounted on the hub 54 are a pair of magnetic elements 62. As the hub 54 rotates and hence causes rotation of the rotatable shaft 46, the pair of magnetic elements 62 will successively pass the magnetic sensor 60. As this occurs, a pulse is generated for each rotation. Where two magnets are employed, a pair of pulses are generated and these pair of pulses may constitute a single count or pulse count for the control circuit, as hereinafter described.

Each rotation of the rotatable shaft 46 represents a fixed increment of distance of movement of the swinging gate 10. Therefore, by measuring the number of rotations of the rotatable shaft 46, it is possible to precisely measure the extent of movement of the swinging gate 10 from the fully closed position to the fully opened position and also to measure the distance back from the fully opened position to the fully closed position, which are both fixed end positions. A signal representative of this measurement is stored in the control circuit as hereinafter described, and used on subsequent occasions to cause energization of the small drive mechanism 22 to move the swinging gate 10 for this measured distance.

The use of the magnetic sensor assembly as described herein offers many unique advantages over optical sensors which have been used in the prior art gate opening and closing apparatus. The magnetic sensor assembly is not as sensitive to dirt and grease and other foreign matter accumulation. Hence, the present invention is reliable and essentially trouble-free in operation. Moreover, it does not require maintenance previously encountered with prior art gate operators. In this case, it can be seen that the pair of magnetic elements 62 and the magnetic sensor 60 are located within the housing 26 and hence essentially isolated from dirt and other foreign matter environments.

The control circuit 66, in FIG. 6 of the drawings comprises a microprocessor 68 which includes a central processing unit 70 and a latching circuit 72 as well as a memory unit, such as a programmable read-only memory 74. The microprocessor 68 is operated on a clock time basis by a master clock circuit 76, a clock pulse generating circuit 78, and an adjustable oscillator 80. The clock pulse generating circuit 78 includes a plurality of inverting amplifiers 82 in the manner as illustrated along with a capacitor 84 connected across a feedback line 86 between the inverting amplifiers 82. The adjustable oscillator 80 also comprises a pair of inverting amplifiers 88 with an adjustable resister 90 connected in a feedback loop 92 across the inverting amplifiers 88. A switch 94 may be provided for turning the oscillator on and off. The master clock circuit 76 provides the necessary control timing for operation of the entire control circuit 66. In addition, the adjustable oscillator 80 controls the rate of movement of the gate during opening and closing.

A signal generator 96 receives an input from the magnetic detector 60 over an input line 98 and which generates an electrical signal and responds to each detection of a rotation of one of the magnetic elements 62. The signal generated by the signal generator 96 is introduced into a counter 100 for determining the number of counts of the rotation of the rotatable worm shaft 46 and introduces that number into the central processing unit 70 where it may be stored in the programmable read only memory 74. Thus, the opening and closing movement of the gate can be controlled on all subsequent occasions.

The microprocessor 68 also receives an input from a radio frequency input circuit 102, as illustrated in FIG. 6. This circuit would include a radio frequency sensor 104 connected to a voltage supply 106 forming part of or connected to a resistive network 108. The output of the sensor 104 is introduced through a filtering capacitor 110 and an inverting amplifier 112 into an And gate 114.

The microprocessor 70 also receives a key input from a key input circuit 116 and which also has a key operated mechanism identified by a pair of inputs 118. One of the inputs is connected to a voltage supply, as illustrated. This same input is connected through a coupling resistor 120 and grounded capacitor 122 to an And gate 124. The other of the inputs 118 is also connected through a resistor 126 and a capacitor 128 to the And gate 124. These two inputs are added in the And gate 124 and the output of the key operated circuit 116 is added with the output of the radio frequency input circuit in another And gate 130. The output of this And gate 130 is thereupon introduced into the central processing unit 70.

The control circuit 66 of the present invention also comprises a gate obstruction input circuit 132. In this case, a voltage rise, as a result of a back EMF may be generated in the armature of the motor which causes a signal designated by the input 134. This signal is connected to a positive voltage source 136 and is introduced through a coupling resistor 138 into a pair of inputs of an And gate 140. A grounded capacitor 142 and diode resistor arrangement 144 are also connected to the input of the And gate 140.

The control circuit 66 of the present invention shows the availability of differing types of input and which are only exemplary of the various numerous types of imputes which can be used. All of these imputes are introduced into the central processing unit and if they constitute a valid input, the processing unit will allow opening movement of the gate. In addition to the foregoing, it can be seen that the control circuit of the present invention includes a unique gate obstruction input operating with a small simple electric motor of the type used herein. In this case the gate obstruction input will also cause a movement of the gate from the point of impact with an obstruction back to an opened position. The actual details of measuring the amount of movement and using that movement for subsequent movements of the gate is relatively simply electrically performed. However, a reference can be made to U.S. Pat. No. 4,429,264 by Moscow Richmond for the details thereof.

As indicated previously, a bottoming out of the extensible and retractable arm 48 on the threaded worm shaft 46 could cause serious damage to the entire small drive mechanism 22. For example, reference to FIG. 2 will reveal that when the extensible and retractable arm 48 reaches its outermost limit of travel, tabs on the end thereof would engage the fixed nut 50. Continued rotation of the electric motor 28 would cause damage to this mechanism and potentially to the electric motor 28, as well. The present invention overcomes this problem by pulsing the electric motor 28 in the manner as previously described.

For the purposes of pulsing the electric motor 28, a pulse control circuit 150 is provided and operates in conjunction with a measurement counter 152. These two components receive an input from the central processing unit 70 and provide a return input to the central processing unit 70. Each time that the central processing unit 70 receives an input to open the gate, from any source, a signal is introduced into the measurement counter 152. The measurement counter will determine if this is the first measurement of the gate to the opened or otherwise to the closed position in response to the input signal and particularly sense any power interruption to the circuit. If it is indeed the first input, the measurement counter 152 will set the pulse control circuit to cause a pulsing of the electric motor 28. In this case, the pulse control circuit will cause the central processing unit to initiate a pulsing signal for the motor through a drive network hereinafter described. Moreover, the pulse control network will cause the central processing unit 70 to pulse the electric motor 28 throughout the continuous movement of the motor from this closed position to this opened position or otherwise from the opened position back to the closed position, or both.

If the signal introduced into the measurement counter 152 is merely another opening or a closing signal after an initial measurement and before any interruption of power, then the pulse control circuit will not send a signal to the central processing unit 70 to cause a pulsing of the motor for the entire opening and closing movement. Rather, the pulse control circuit 150 will only cause the central processing unit 70 to pulse the electric motor 28 for the last portion of travel from the opened position to the closed position and possibly from the closed position to the opened position, as well.

The problem primarily arises in the bottoming out when the gate is extended to the fully closed position. As a result, pulsing will typically occur during the last few feet of movement of the gate from the fully opened position to the fully closed position and for the last few feet of movement of the gate from the fully closed position to the fully opened position. As also indicated previously, it may be desirable to pulse movement of the gate during the beginning portion of any opening and closing movement. Thus, for example, if two hundred counts were stored in the programmable read-only memory 74 as a measure of movement from the fully opened position to the fully closed position, the central processing unit would cause the motor to operate at a normal speed without any pulsing to move the gate for, e.g., one hundred eighty-five counts or pulses. However, during the last fifteen counts or pulses, the central processing unit 70 would cause the electric motor 28 to pulse and thereby move the gate in small increments to the fully closed position.

The central processing unit 70 has outputs to a pair of driver circuits 154 and 156 which also are connected to positive voltage sources as shown. These driver circuits 154 and 156 are connected to the electric motor 28, also as best shown in FIG. 6 of the drawing. The driver circuits may adopt the form of relay circuits or the like or otherwise condition a signal from the central processing unit 70 to enable operation of the electric motor 28.

The central processing unit 70 also has a third motor operating output connected directly to a driver circuit 158. The output of the driver circuit 158 is connected to a triax 160. The output of the triax 160 is directed to some form of locking mechanism not shown as, for example, either a solenoid operated lock or otherwise a magnetic lock. In this way, the control circuit 66 can cause an automatic locking or unlocking of a lock at the gate when it reaches the closed position. The driver circuit 158 similarly receives a magnetic lock input 162 from a magnetic lock input circuit 164. The magnetic lock input circuit receives the input from the central processing unit 70 which is also delivered to the driver circuit 158 to cause operation of a magnetic lock. In this way, the invention can be operable with either a solenoid lock or a form of magnetic lock or both, or for that matter, other types of lock mechanisms.

In accordance with the above-outlined construction, it can be observed that the present invention provides a gate operator which is capable of moving a gate between an opened and closed positions by means of a simple very small electric vertically arranged electric motor unit, having an extensible and retractable arm. Moreover, the control circuit used with the drive mechanism forming part of the gate operator will detect for gate obstructions and cause movement of the gate back to an opened position when an obstruction has been detected. In like manner, it allows for measurement of the distance of movement of the gate between the fully opened and fully closed positions to control movement of the gate between these positions on each subsequent movement thereof. In addition, the gate operator of the invention also provides for a pulsing of the motor to ensure against any damage to the entire drive mechanism as a result of bottoming out.

The present invention is highly reliable and can be constructed at a much lower unit cost than previously described and available gate operators. Moreover, the gate operator of the present invention is considerably smaller than any commercially available gate operator.

Thus, there has been illustrated and described a unique and novel gate operator and a method associated therewith which fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described the invention, what I desire to claim and secure by Letters Patent is:

1. A gate operator for moving a gate between opened and closed fixed end positions and where one said end positions may have limited access space beyond that end position precluding location of a ground mounted operator in that limited access space, said gate operator comprising:

a) drive means providing a source of driving power;

b) an actuating arm powered by said drive means and having a rotatable shaft and an extensible arm portion which is extensible and retractable in response to rotatable movement of the rotatable shaft to move said gate between the fixed end positions and which causes movement to one end position in response to extensible movement and to the other end position in response to retracting movement;

c) means connecting said rotatable shaft to said extensible arm portion which converts the rotating motion of the rotatable shaft to a linear extensible and retractable movement of said extensible arm portion and which is also aligned with said rotatable shaft;

d) sensor means operatively associated with said rotatable shaft to generate counts of rotation in response to rotatable movement of the rotatable shaft; and e) control means operatively connected to said drive means and sensor means and receiving the counts of rotation and measuring the distance of movement between one end position and the other end position and storing a distance count representative of that distance of movement, said control means causing said drive means to move the gate between the said one end position to said other end position only for the stored distance count on each subsequent occasion when the gate is moved from that one end position to the other end position.

2. The gate operator of claim 1 further characterized in that said control means measures the distance of movement from the closed end position to the opened end position and stores a first distance count representative of that distance of movement and from the opened end position back to the closed end position and stores a second distance count therefor, said control means further moving said gate on subsequent movements from the closed position to the opened position for a distance equivalent to the first distance count, and said control means also moving the gate on subsequent movements from the opened position back to the closed position for a distance equivalent to the second distance count movement.

3. The gate operator of claim 1 further characterized in that said sensor means is connected to said control means for generating a distance count responsive to revolutions of a rotatable member and which count is representative of the measured distance of movement.

4. The gate operator of claim 1 further characterized in that the rotatable shaft is rotatable about its central axis and said extensible and retractable arm portion is connected to the outer end of the rotatable shaft, and where the extensible and retractable arm portion is extensible and retractable in response to rotatable movement of the rotatable shaft, and means for measuring the amount of rotation of the rotatable shaft and where the amount of rotation is proportional to and constitutes a basis of generating the distance count.

5. The gate operator of claim 1 further characterized in that a pulsing means is operatively associated with said control means for causing the drive means to pulse movement of the actuating arm in the initial movement from one end position to the other end position during measurement of the distance between the two fixed end positions.

6. The gate operator of claim 5 further characterized in that said pulsing means causes a pulsing of the drive means and of the actuating arm for a limited distance in advance of movement between one end position.

7. The gate operator of claim 1 further characterized in that obstruction detection means is associated with said control means and causes said gate to move toward the opened position if the gate encounters an obstruction during movement from the opened position back to the closed position.

8. A gate operator for moving a gate between opened and closed fixed end positions with an extensible actuating arm and where bottoming out of said actuating arm does not damage said operator, said gate operator comprising:
 a) drive means providing a source of driving power;
 b) an actuating arm powered by said drive means and having a portion which is extensible to move said gate between the fixed end positions and which causes movement to one end position in response to extensible movement and to the other end position in response to retracting movement;
 c) a control means for causing a pulsing of the drive means and hence a pulsing of the movement of the actuating arm for a limited distance in advance of each fixed end position during a portion of the travel from one fixed end position to the other fixed end position and which pulsing is present in an amount sufficient to preclude any damage to the operator in the event that the actuating arm bottoms out in its extensible movement, and where there are periods of operation of the drive means causing operation of the actuating arm without any pulsing action; and
 d) means for detecting the position of the gate between the fixed end positions and sending position determining signals to the control means in response thereto so that the control means will recognize the limited distance in advance of the fixed end positions and initiate the pulsing action.

9. The gate operator of claim 8 further characterized in that said control means causes a pulsing of said drive means and said actuating arm a small distance in advance of the closed position when the gate is moving from the opened position to the closed position.

10. The gate operator of claim 9 further characterized in that said control means causes a pulsing of the drive means and the actuating arm at the beginning of movement of the gate from the opened position to the closed position such that pulsing occurs at the beginning of the movement and at the end of the movement.

11. The gate operator of claim 10 further characterized in that said control means causes a pulsing of the drive means and the actuating arm a small distance in advance of the opened position when the gate is moving from the closed position to the opened position.

12. The gate operator of claim 9 further characterized in that said control means determines the distance of movement from one end position to the other end position and stores that measure of distance and thereby causes the gate to move between the one end position to the other end position on subsequent occasions for the measured distance of movement.

13. The gate operator of claim 9 further characterized in that said control means causes a pulsing of the drive means for the full distance of movement of the gate between two fixed end positions on the first movement between those two fixed end positions.

14. The gate operator of claim 12 further characterized in that said control means measures the distance of movement from the closed end position to the opened end position and stores a first distance count representative of that distance of movement and from the opened end position back to the closed end position and stores a second distance count therefor, said control means further moving said gate on subsequent movements between the closed position to the opened position for the distance equivalent to the first distance count, and said control means also moving the gate on subsequent occasions from the opened position back to the closed position for a distance equivalent to the second distance count.

15. The gate operator of claim 12 further characterized in that obstruction detection means is associated with said control means and causes movement of the gate back to the opened position in the event that the gate contacts an obstruction during movement from the opened position to the closed position.

16. The gate operator of claim 12 further characterized in that the actuating arm has a first arm portion which is rotatable about its central axis and a second arm portion connected to the first arm portion and which is extensible and retractable in response to rotatable movement of the first arm portion.

17. A gate operator for moving a gate between opened and closed fixed end positions and where one of said end positions may have limited access space beyond that end position precluding location of a ground mounted operator in that limited access space, said gate operator comprising:
 a) a cylindrically shaped drive motor for providing a source of driving power to said operator;
 b) an outer housing having an interior chamber for receiving said drive motor and where the drive motor has a drive shaft extending from one end thereof;
 c) an actuating arm powered by said drive motor and having a rotatable portion and a portion which is extensible and retractable to move said gate between the fixed end positions and which causes movement to one fixed end position in response to extensible movement and to the other end position in response to retracting movement and where the extensible and retractable movement occurs in response to rotation of the rotatable portion;

d) a magnetic sensor mounted on said drive motor within said housing in close proximity to and facing a portion of said rotatable portion of said actuating arm;

e) at least one magnetic pulse generating element mounted with respect to said actuating arm such that at least one magnetic pulse generating element and the sensor generate counts in response to movement of said actuating arm; and f) control means for measuring the pulses generated by said sensor and said at least one magnetic pulse generating element and utilizing said measure of pulses to make a movement of the gate.

18. The gate operator of claim 17 further characterized in that said pulse generating element is a magnetic element.

19. The gate operator of claim 17 further characterized in that said pulse generating element is magnetically held upon said actuating arm.

20. The gate operator of claim 17 further characterized in that said sensor detects and causes generation of a magnetic pulse in response to rotation of said rotatable portion of said actuating arm and in response to passing of the magnetic pulse generating element with respect to the sensor.

21. The gate operator of claim 17 further characterized in that said control means is connected to said drive motor and uses the measure of distance of the gate for causing subsequent movement of the gate between the same two fixed end positions on subsequent movements of the gate.

22. The gate operator of claim 19 further characterized in that the rotatable arm portion is rotatable about its central axis and said extensible and retractable portion is extensible and retractable in response to rotatable movement of the rotatable arm portion.

23. A method of moving a gate between opened and closed fixed end positions and where one of said positions may have a limited access space beyond that end position precluding location of a ground mounted operator in that limited access space, said method comprising:

a) energizing a drive means to provide a source of driving power for said operator;

b) causing rotatable movement of a rotatable portion of an actuating arm in response to energization of the drive means and thereby causing an extending of an extensible and retractable portion of said actuating arm and causing retraction of same and where said extensible and retractable portion is generally aligned with and extends outwardly beyond said rotatable portion;

c) causing movement of said gate from one fixed end position to the other fixed end position in response to extensible movement of said extensible arm portion and causing movement to the opposite end position in response to a retracting movement of the extensible arm portion;

d) generating counts representative of rotation of the rotatable portion of the actuating arm during rotatable movement of same;

e) measuring the distance of movement between one end position and the other end position and storing a count representing that measure of distance; and f) causing movement of the gate between that one end position and the other end position only for the stored distance count on each subsequent occasion when the gate is moved between that one end position and the other end position.

24. The method of claim 23 further characterized in that said method comprises measuring the distance of movement between the closed and opened positions and subsequently moving the gate for that measured distance of movement on each subsequent movement from the closed to the open position and measuring the distance of movement of the gate from the closed to the opened position and subsequently moving the gate on each subsequent movement for that measured distance from the closed to the opened position.

25. The method of claim 23 further characterized in that said method comprises detecting an obstruction during movement of the gate from an opened position to a closed position and automatically causing movement of the gate back to the opened position in the event of contact with an obstruction.

26. The method of claim 23 further characterized in that said method comprises generating counts representative of distances of movement of the actuating arm and utilizing such counts to determine the distance of movement of the gate.

* * * * *